United States Patent
Potluri et al.

(10) Patent No.: US 11,848,942 B2
(45) Date of Patent: Dec. 19, 2023

(54) METHOD FOR DETECTING INTRUSION IN DISTRIBUTED FIELD BUS OF A NETWORK AND SYSTEM THEREOF

(71) Applicant: DAIMLER AG, Stuttgart (DE)

(72) Inventors: Chandrasekhar Potluri, Farmington Hills, MI (US); Andreas Krueger, Aidlingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 358 days.

(21) Appl. No.: 17/312,073

(22) PCT Filed: Nov. 28, 2019

(86) PCT No.: PCT/EP2019/082981
§ 371 (c)(1),
(2) Date: Jun. 9, 2021

(87) PCT Pub. No.: WO2020/120160
PCT Pub. Date: Jun. 18, 2020

(65) Prior Publication Data
US 2022/0030014 A1 Jan. 27, 2022

(30) Foreign Application Priority Data
Dec. 10, 2018 (IN) .............................. 201841046626

(51) Int. Cl.
*H04L 29/06* (2006.01)
*H04L 9/40* (2022.01)
(52) U.S. Cl.
CPC ...... *H04L 63/1416* (2013.01); *H04L 63/1491* (2013.01)
(58) Field of Classification Search
CPC .................. H04L 63/1416; H04L 63/1491
See application file for complete search history.

(56) References Cited

U.S. PATENT DOCUMENTS 11,245,535 B2 * 2/2022 Ma .......................... H04L 12/66
2013/0073851 A1 3/2013 Hashimoto et al.
(Continued)

FOREIGN PATENT DOCUMENTS

CN 106105093 A 11/2016
EP 3264718 A1 1/2018
(Continued)

OTHER PUBLICATIONS

Office Action dated Oct. 10, 2022 in related/corresponding CN Application No. 201980081435.4.
(Continued)

*Primary Examiner* — Baotran N To
(74) *Attorney, Agent, or Firm* — PATENT PORTFOLIO BUILDERS PLLC

(57) ABSTRACT

A method and system for detecting intrusion in a distributed field bus of a vehicle network involve using an Intrusion Detection System (IDS) to detect intrusion in the network. In a network with a number of nodes, IDS is configured in each of the number of nodes. The IDS, in a first node configured in a transmission mode, receives at least one message signal. A hash function is performed on at least one message signal for generating a first Honeypot (HPT) signal. Simultaneously, the first node transmits the first HPT signal to the second node. The first node and the second node generates a reference HPT and second HPT respectively using an echo-hash function. The IDS detect intrusion based on a comparison of the reference HPT and the second HPT. The method is independent of network traffic timing and can be performed in real-time.

14 Claims, 6 Drawing Sheets

(56) References Cited

U.S. PATENT DOCUMENTS

| | | | |
|---|---|---|---|
| 2014/0328352 A1 | 11/2014 | Mabuchi et al. | |
| 2016/0344764 A1 | 11/2016 | Otsuka | |
| 2017/0195878 A1 | 7/2017 | Takemori et al. | |
| 2018/0007076 A1* | 1/2018 | Galula | H04L 69/40 |
| 2018/0234248 A1* | 8/2018 | Imamoto | H04L 12/40 |
| 2019/0288849 A1* | 9/2019 | Ma | H04L 12/40 |

FOREIGN PATENT DOCUMENTS

| | | |
|---|---|---|
| WO | 2016151566 A1 | 9/2016 |
| WO | 2018017566 A1 | 1/2018 |

OTHER PUBLICATIONS

International Search Report and Written Opinion dated Feb. 7, 2020 in related/corresponding International Application No. PCT/EP2019/082981.

* cited by examiner

METHOD FOR DETECTING INTRUSION IN DISTRIBUTED FIELD BUS OF A NETWORK AND SYSTEM THEREOF

DESCRIPTION OF THE INVENTION

Technical Field

The present disclosure relates to network security. More particularly, but not specifically, the present disclosure relates to a method and system for detecting intrusion in distributed field-bus in-vehicle networks.

Background of the Disclosure

Automobiles are typically equipped with multiple Electronic Control Units (ECUs) for controlling and operating the automobiles. In-vehicle network of an automobile consists of several ECU's connected via multiple distributed field-bus networks. The ECUs communicate with each other or with a gateway/Main Controller Unit (MCU) using standard in-vehicle field-bus protocols like Controller Area Network (CAN), LIN (Local Interconnect Network), FlexRay™ and MOST™ (Media Oriented Systems Transport). Recent innovations in automobiles require Vehicle-To-Vehicle (V2V) and Vehicle-To-Infrastructure (V2I) short range communication as well as vehicle-to-Internet communication via an embedded modem or Bluetooth paired user devices. Connected vehicle technology also includes connectivity to external devices such as smartphones and tablet PCs.

As vehicles are connected to external networks, they have a bigger attack surface, which makes them vulnerable to cyber-attacks. Remote connectivity of vehicles provides ways for malicious actors to exploit vulnerabilities through the external communication interfaces, which causes damage and safety concerns. For example, hackers can gain access to the in-vehicle networks via external interfaces and exploit vulnerabilities, which causes safety critical systems to fail or pushed out of the safety limits. Such attacks cause severe damage to the vehicle, people in the vehicle, and to the surrounding people and infrastructure. Therefore, vehicle connectivity to external interfaces pose severe security risks.

Existing field bus security mechanisms require dedicated hardware for enabling secure communication over the distributed fieldbus protocols. The dedicated hardware approach results in increased development costs. Further, the vehicle architectures that are currently under development may find it difficult to adapt to hardware solutions due to the limitation of one-time programmability and these solutions require dedicated debug interfaces (specialized electronics for debugging). Therefore, the vehicle architectures that are developed or currently under development cannot use the dedicated hardware-based security mechanisms as they would have to perform significant changes to adapt to the network architectures. Thus, the use of dedicated hardware makes it difficult for reconfiguring/updating the hardware security mechanisms after the production of the vehicles.

Few other conventional field bus security solutions use low-level cryptographic algorithms like symmetric key cryptography, public key cryptography to ensure integrity and authentication of messages. However, generation and management of keys possesses challenges as asymmetric keys (unique per message is computationally expensive) and symmetric keys are easily cracked over-time by brute force attacks. Further, conventional field bus security solutions also include methods like grouping of input messages into logical blocks for assigning asymmetric keys unique to a logical block and usage of truncated cryptographic Message Authentication Codes (MAC). Thus, the existing field-bus security mechanisms can be exploited by the hackers.

None of the existing solutions provide a secure and robust way communication using the distributed field-bus protocols for in-vehicle network applications. One such conventional arrangement employed in the vehicles is disclosed in WO 2016151566 A1 (hereinafter referred to as PA1). The PA1 discloses detecting anomalous traffic in the CAN bus networks of a vehicle by analyzing the timing of one or more frames that are being transmitted on the bus. Thus, PA1 uses only timing analysis for detecting intrusion in the network. Using the method disclosed in PA1 leads to a disadvantage as the system detecting intrusion should be adapted and updated in a secure way for all the timing changes caused due to the change in functional requirements.

The information disclosed in this background of the disclosure section is only for enhancement of understanding of the general background of the invention and should not be taken as an acknowledgement or any form of suggestion that this information forms the prior art already known to a person skilled in the art.

SUMMARY OF THE DISCLOSURE

In an embodiment, the present disclosure relates to a method for detecting intrusion or anomalous traffic in a network comprising a plurality of nodes configured to communicate over distributed field-bus protocols. In a vehicle network, a node is a part of the Electronic Control Unit (ECU), which is configured to enable communication between the ECU's. An Intrusion Detection System (IDS) can be configured in each of the plurality of nodes. The method comprises receiving a plurality of message signals, by the IDS in a first node configured in a transmission mode. The first node packs the plurality of message signals in a Protocol Data Unit (PDU) configured for transmission. Further, a first Honeypot (HPT) signal is generated by performing a hash function on at least one signal among the plurality of message signals. The first HPT signal is packed in the PDU and configured to be transmitted over the distributed field-bus to a second node among the plurality of nodes, configured for receiving the PDU. Furthermore, the HPT signal that is transmitted in the PDU is stored in the memory of the first/sender node. The second/receiver node echoes the hashed HPT signal and hashes with a different hash function and the HPT signal from the second node is called second honeypot signal. Thereafter, the second HPT signal is received from the second node. The second HPT signal is generated by the second node by echoing the first HPT signal using the echo-hash function. The second HPT signal may be generated by the IDS configured in the second node or by a unit in the second node configured to perform echo-hash function on the first HPT received by the second node. Finally, the reference HPT signal and the second HPT signal are compared, and a value of the comparison is used to detect an intrusion in the distributed field bus.

In an embodiment, the present disclosure discloses an Intrusion Detection System (IDS), for detecting intrusion in a network comprising a plurality of nodes configured to communicate over a distributed field bus. In a vehicle network, a node is an Electronic Control Unit (ECU) configured in the vehicle. The IDS comprise a processor and a memory, communicatively coupled to the processor, storing processor executable instructions, which, on execution causes the processor to receive a plurality of message signals. The IDS is configured in a first node configured in a transmission mode. The first node packs the plurality of message signals in a PDU configured for transmission by the first node. Further, the processor is configured to generate a first Honeypot (HPT) signal by performing a hash function on at least one message signal among the plurality of message signals. Furthermore, the processor is configured to pack the first HPT signal in the PDU for transmission over the distributed field bus to a second node among the plurality of nodes, configured for receiving the PDU. Thereafter, the processor is configured to generate a reference HPT signal by echoing the first HPT signal using an echo-hash function. The reference HPT signal is stored in a memory associated with the IDS. Further, the processor is configured to receive a second HPT signal from the second node. The second HPT signal is generated by the second node by echoing the first HPT signal using the echo-hash function. The second HPT signal may be generated by the IDS configured in the second node or by a unit in the second node configured to perform echo-hash function on the first HPT received by the second node. Finally, the processor is configured to compare the reference HPT signal and the second HPT signal, and a value of the comparison is used to detect an intrusion in the distributed field bus.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The novel features and characteristic of the disclosure are set forth in the appended claims. The disclosure itself, however, as well as a preferred mode of use, further objectives, and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
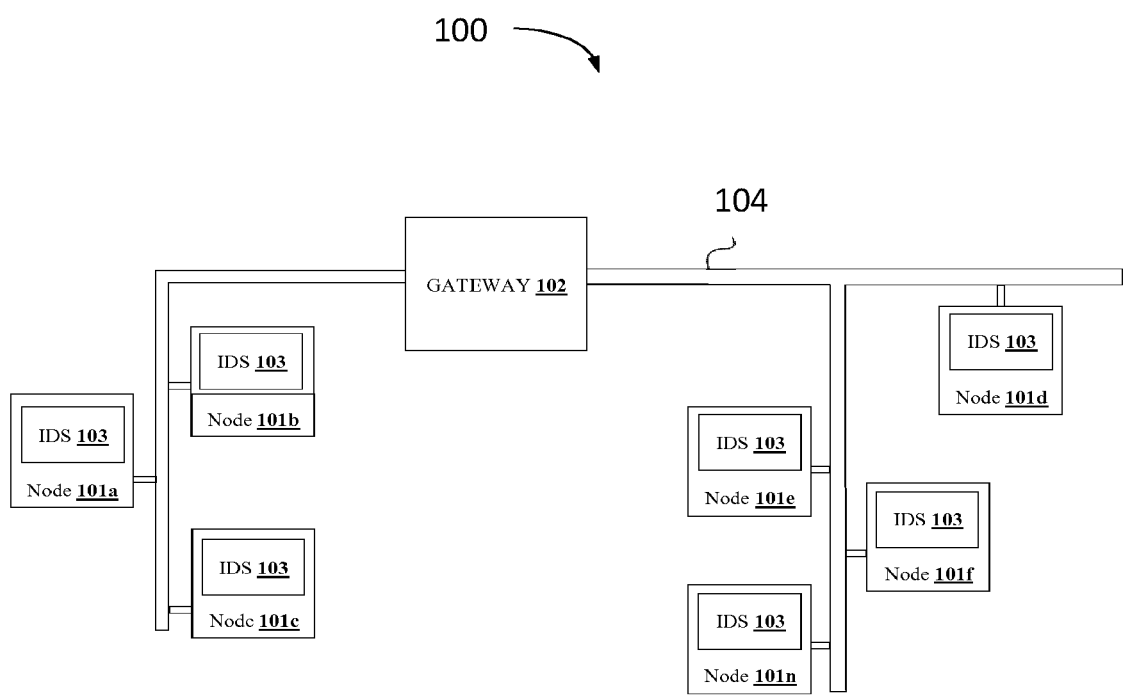
FIG. 1 shows a network architecture 100 in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and system for detecting intrusion in a distributed field bus of a network. An Intrusion Detection System (IDS) is used to detect malicious activity/intrusion in the network and raise an alert within the network. In a network comprising a plurality of nodes, an IDS is configured in each of the plurality of nodes. The IDS in a first node configured in a transmission mode receives message signals present in a Protocol Data Unit (PDU), which is configured to be transmitted to a second node in the network. A hash function is performed on at least one message signal for generating a hash signal. The generated hash signal is referred as a first Honeypot (HPT) signal. Further, a reference HPT signal is generated by the first node by echoing the first HPT signal using an echo-hash function and the reference HPT signal is stored in a memory associated with the first node/IDS. Simultaneously, the first node transmits the first HPT signal to the second node. Further, the IDS receive a second HPT signal from the second node. The second HPT signal is generated by the second node by echoing the first HPT signal using the echo-hash function. The IDS in the first node then compares the reference HPT signal and the second HPT signal for detecting intrusion on the distributed field bus. A difference in the reference HPT signal and the second HPT signal indicates occurrence of intrusion on the distributed field bus.

FIG. 1 is indicative of a network architecture 100 in accordance with some embodiments of the present disclosure. The network architecture 100 comprises a node 101a, node 101b, node 101c, node 101n, gateway 102 and distributed field bus 104. The node 101a-101c and 101n may be referred to as plurality of nodes 101 hereafter in the present disclosure. The distributed field bus 104 interconnects the plurality of nodes 101 and the gateway 102. The gateway 102 facilitates communication between the plurality of nodes 101. In an in-vehicle network, the plurality of nodes 101 represents plurality of Electronic Control Units (ECUs) 101 configured in a vehicle. In the in-vehicle network, the gateway 102 separates the plurality of ECUs 101 and on-board diagnostics (OBD) (not shown) and divides the in-vehicle network into functional domains (e.g., body control module, chassis control module, power train control module). Each functional domain may comprise one or more ECUs. An ECU of one functional domain may communicate with an ECU of another functional domain via the gateway/MCU 102. The gateway 102 is responsible for communication between the functional domains. Each of the functional domains may have corresponding ECUs. Two ECUs in the same functional domain may communicate directly with each other over the distributed field bus 104. For example, an ECU in a body control module may transmit a message signal to an ECU in the chassis control module. The gateway 102 may facilitate the communication between the ECU in the body control module and the ECU in the chassis control module.

In an embodiment, the ECUs may receive the at least one message from one or more sensors associated with each functional domain. For example, a door sensor may provide measurements related to status of a door (opening and closing of a door) in the vehicle to one or more ECUs in a door control module. Likewise, each functional domain may be associated with one or more sensors, and ECUs in the functional domain receive measurements/information related to that domain from corresponding one or more sensors.

An intruder may try to intrude the network by corrupting the vehicle network data and commands. The intruder may try to analyze the traffic through the distributed field bus 104 or may corrupt the data being transmitted in the distributed field bus 104 by placing a malware when the network is used by the plurality of ECUs 101. Consider an instance where a person/vehicle owner tries to lock the vehicle using a remote locking device. The intruder may corrupt the data being sent by the remote locking device to lock the vehicle and no action is initiated and the vehicle's doors remain unlocked. Thus, the intruder may pose an attack to the vehicle. In another instance the intruder may jam the signal from the impact sensors. Thereby, during an accident the airbag may not be activated. Such circumstances may cause harm to a driver and passengers in the vehicle. In order to detect intrusion in the distributed field bus 104 an Intrusion detection system (IDS) 103 is configured in each of the plurality of ECUs 101.

The IDS 103 is used to detect intrusion or anomalous traffic on the distributed field bus 104 by using Honeypots. An output from the IDS 103 may be referred as a Honeypot. The Honeypots mimics the behavior of the network, i.e., a honeypot signal can be same as the message signal. Thus, the intruder may try to study the activity of honeypot assuming that the honeypot is an original message signal. The instance at which the intruder tries to access the honeypot signal, the IDS 103 is alerted of the intrusion. The honeypots trick/lure the malware to study, monitor and spoof the activity of the honeypots. Thus, the intruder may not detect the honeypot and may not be able to bypass the Honeypot. Honeypots can be a signal or a node. The IDS 103 may be configured in any ECU of the plurality of ECUs 101 networked with the distributed field bus 104. The plurality of ECUs 101 deploys random honeypot field-bus signals or messages between a sender node and a receiver node. The HPT signals are constructed from the original message signal and hence tricks the intruder. Upon accessing the HPT signal by the intruder, the IDS 103 detects the intrusion in the distributed field bus 104. In an embodiment, the IDS 103 may be deployed in an application layer of the ECU.

The foregoing description is with respect to in-vehicle network architecture. The in-vehicle networks may use Controller Area Network (CAN), Local Interconnect Network (LIN), FlexRay™, MOST™ (Media Oriented Systems Transport), Automotive Ethernet and physical layers alike for communication.

Figure 2:
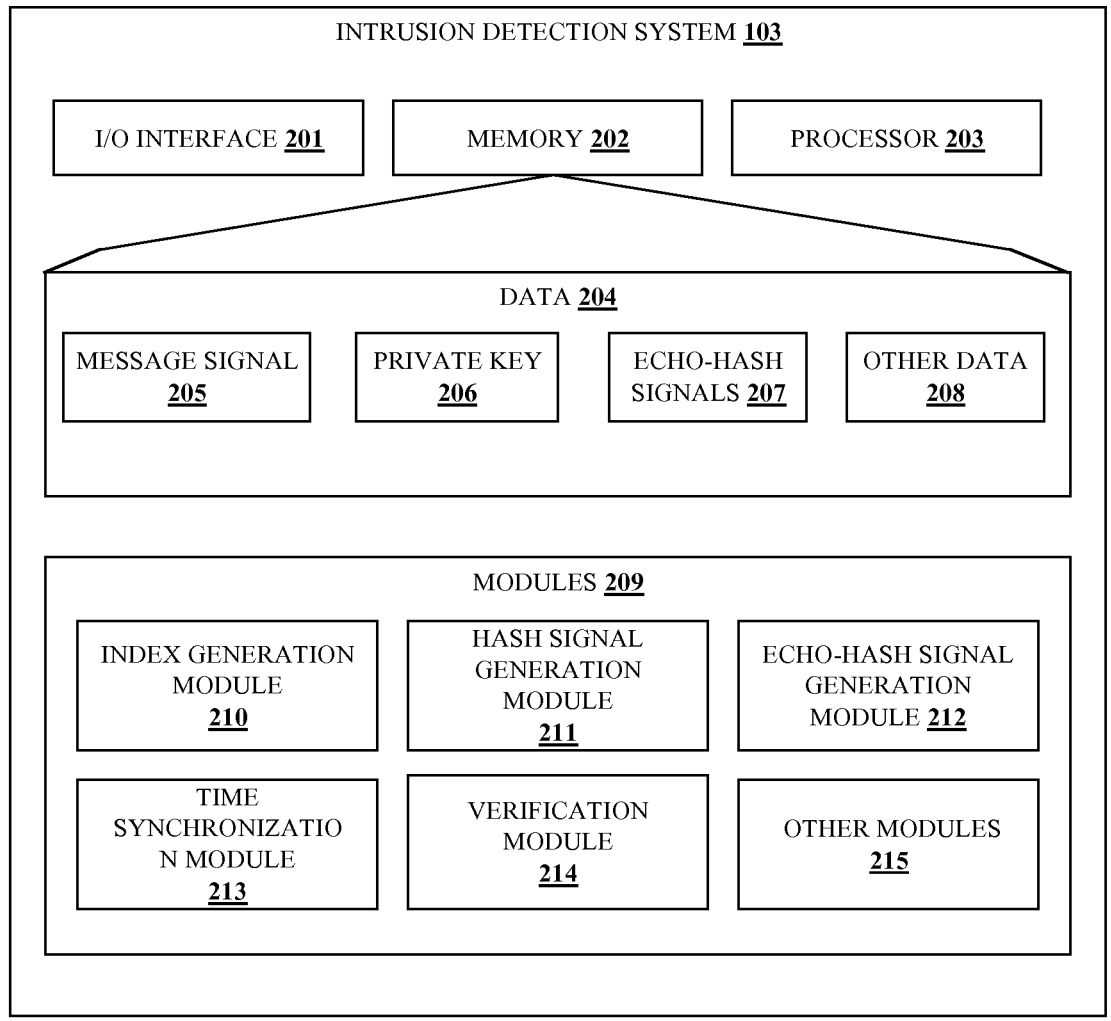
FIG. 2 shows an internal architecture of an Intrusion Detection System (IDS) for detecting intrusion in a distributed field bus of an in-vehicle network in accordance with some embodiments of the present disclosure.

FIG. 2 shows an internal architecture of an IDS 103 for detecting intrusion in the distributed field bus 104 of the in-vehicle network, in accordance with some embodiments of the present disclosure. The IDS 103 may include at least one processor 203 and a memory 202 storing instructions executable by the at least one processor 203. In an embodiment, the memory 202 may be present as a separate unit outside the IDS 103, as a part of the ECU in which the IDS 103 is configured. Consider that the IDS 103 is configured in the ECU 101a. A part of the memory of the ECU 101a may be shared with the IDS 103. The shared memory may be dedicated to the IDS 103 only. The processor 203 may be a data processor for executing program components for executing user or system-generated requests. The memory 202 is communicatively coupled to the processor 203. The IDS 103 further comprises an Input/Output (I/O) interface 201. The I/O interface 201 is coupled with the processor 203 through which an input signal or/and an output signal is communicated. In an embodiment, the I/O interface 201 receives the plurality of message signals and message frames from at least one ECU among the plurality of ECUs 101. The I/O interface 201 may also facilitate transmission of message signals from each of the plurality of ECUs 101.

In an embodiment, data 204 may be stored within the memory 202. The data 204 may include, for example, message signal 205, private key 206, echo-hash signals 207, and other data 208.

In an embodiment, the message signal 205 may refer to the plurality of message signals received from the one or more sensors and actuators configured in the vehicle. The plurality of message signals received by each ECU of the plurality of ECUs 101 may be stored in the memory of the corresponding ECU and may be transmitted to other ECU or the gateway 102 upon request. The plurality of message signals may be stored in a stack structure in the memory. Considering an instance, the gateway 102 may request the engine temperature data from an engine control module. ECUs may receive the temperature data from the temperature sensor and may transmit the temperature data to the gateway 102.

The private key 206 may refer to a randomly generated bit stream which is unique for every usage. The IDS 103 may receive the random private key through the I/O interface 201. The private key 206 may be used by the IDS 103 for generating an index used to point to a single memory location of the signal stack. The IDS 103 accesses at least one message signal of the plurality of message signals present in the memory location of the signal stack.

The echo-hash signals are echoed hash signals generated using an echo-hash function. The echo-hash signal generated by the IDS 103 is stored in the memory 202 and may be used by the IDS 103 for detecting intrusion in the distributed field bus 104.

The other data 208 may include, but are not limited to, hash functions data, echo-hash functions data.

The hash functions data may refer to a hash function used for generating the HPT signal. The hash function data may comprise one or more hash functions. The IDS 103 may use a random hash function (e.g., MD5 (Message Digest), Secure Hash Algorithms (SHA)) among the one or more hash functions for generating the HPT signal. The hash function may be based on Advanced Encryption Standard (AES) encryption technique.

The echo-hash functions data may refer to the echo-hash function (MD5, SHA) used for generating the echo-hash signal. Similar echo-hash function is stored in a transmitting ECU and a receiving ECU.

In an embodiment, the data 204 in the memory 202 is processed by modules 209 of the IDS 103. As used herein, the term module may refer to an application specific integrated circuit (ASIC), an electronic circuit, a field-programmable gate arrays (FPGA), Programmable System-on-Chip (PSoC), a combinational logic circuit, and/or other suitable components that provide the described functionality. The modules 209 when configured with the functionality defined in the present disclosure will result in a novel hardware.

In one implementation, the modules 209 may include, for example, an index generation module 210, hash signal generation module 211, echo-hash signal generation module 212, time synchronization module 213, verification module 214, and other modules 215. It will be appreciated that such aforementioned modules 209 may be represented as a single module or a combination of different modules.

In an embodiment, the I/O interface 201 receives the plurality of message signals from the one or more sensors provided in the vehicle. The plurality of messages is stored in the signal stack in the memory 202. A person skilled in the art would acknowledge that the plurality of messages can be stored in different structures (linear queue, circular queue, and the like) in the memory 202.

In an embodiment, the index generation module 210 may generate an index for accessing the plurality of message signals stored in the stack. A gate function may be used for generating a stack index. The stack index may be used for accessing and retrieving at least one message signal from the plurality of message signals stored in the signal stack. The stack index points to a particular memory location of a plurality of memory locations comprising the plurality of message signals. For example, consider a stack of five memory locations, each memory location storing one message signal (first, second, third, fourth, and fifth message signal). Let us consider that the gate function and the random private key are used to generate the index, and the index points to the fourth memory segment. The fourth message signal in the fourth memory segment is used to generate the first HPT signal. As the random private key is used, the intruder is unaware of the at least one message signal which is used for generating the HPT signal.

In an embodiment, the hash signal generation module 211 generates the hash signal using the message signal in the stack to which the index is pointing. The message signal in the signal stack to which the stack index points is retrieved by the hash generation module 211 for generating the hash signal. A hash function is a function that can be used to map data of arbitrary size to data of fixed size. The values returned by the hash function are called hash values or a message digest. The message digest is unique to each message. For an instance the SHA is a set of hash algorithms which are used to produce message digest of certain fixed sizes. For example, SHA-256 is one of a number of cryptographic hash functions. The SHA-256 algorithm generates an almost-unique, fixed size 256-bit (32-byte) message digest. Hash is a one-way function and cannot be decrypted to receive the message signal back. Any hash technique like MD5 or SHA and the like can be used for generating the hash signal. The generated hash signal is referred to as a first HPT signal. The first HPT signal is transmitted to the receiver ECU by the transmitter ECU. The hash signal is generated to mimic the message signal. In an embodiment, hashing cycle may be very high. The high hashing cycle disables the malware to use brute force technique to identify the hash signal.

In an embodiment, the echo-hash signal generation module 212 generates the echo-hash signal. As the hash signal is similar to that of the message signal, the hash signal is echoed using the echo-hash function to distinguish the hash signal from the message signal. Output of the echo-hash function is referred as echo-hash signal and is stored in the memory 202. Techniques like MD5 and SHA may be used to generate the echo-hash signal. The echo-hash signal is used as reference for detecting network intrusion and the echo-hash signal generated at the transmitter ECU may be referred to as the reference HPT signal. At the receiver ECU the similar echo-hash function is implemented. The echo-hash signal generation module 212 at the receiver ECU echoes the first HPT signal and generates a second echo-hash signal using the echo-hash function and the first HPT signal. The second echo-hash signal may be referred to as the second HPT signal. The second HPT signal is provided to the transmitter ECU. There may exist a time difference from an instance the first HPT signal is transmitted to the receiver ECU, an instance the second HPT signal is generated and transmitted back to the transmitter ECU, and an instance the second HPT is received by the first ECU.

In an embodiment, the time synchronization module 213 may perform time compensation to the second HPT signal received from the receiver ECU. The time instance of the reference HPT signal and time instance of reception of the second HPT signal are synchronized by the time synchronization module 213. The synchronization is performed using time sync parameters. Subsequent to time synchronization, the reference HPT signal and the second HPT signal are in a same signal format for comparison.

In an embodiment, the verification module 214 is used for verifying if the second HPT signal is similar to the reference HPT signal. Based on the verification the verification module 214 detects if an intrusion has occurred in the distributed field bus 104.

In an embodiment, the other modules 215 may comprise, but is not limited to an alert module. The alert module may alert a network operator and/or driver and/or service personnel. of a possible intrusion from a malicious actor.

Figure 3:
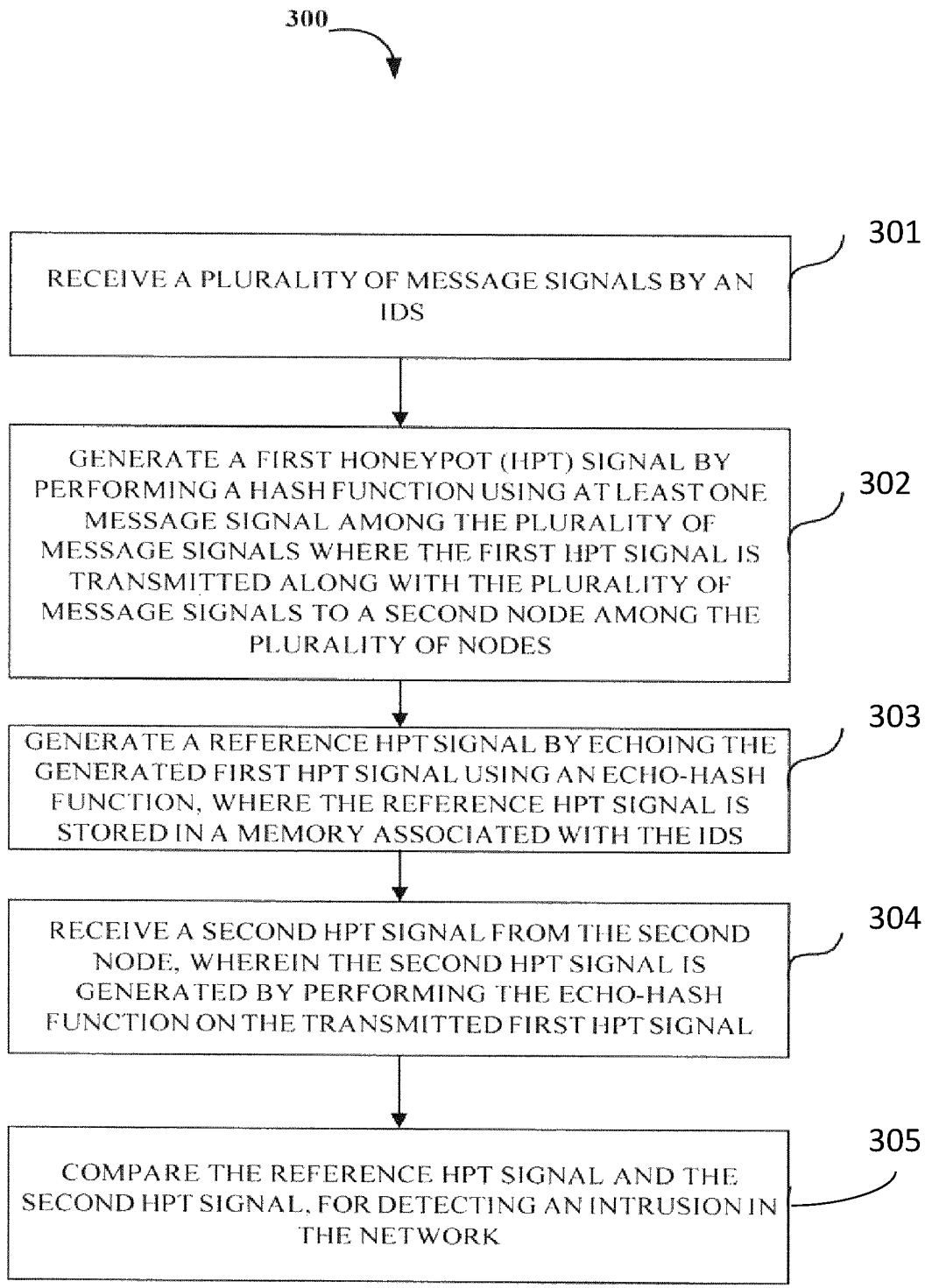
FIG. 3 shows an exemplary flow chart illustrating method steps for detecting intrusion in a distributed field bus of an in-vehicle network in accordance with some embodiments of the present disclosure.

FIG. 3 shows an exemplary flow chart illustrating method steps for detecting intrusion in the distributed field bus 104 of an in-vehicle network in accordance with some embodiments of the present disclosure.

As illustrated in FIG. 3, the method 300 may comprise one or more steps for detecting intrusion in a distributed field bus of an in-vehicle network in accordance with some embodiments of the present disclosure. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 301, the IDS 103 receives at least one message signal among the plurality of message signals stored in the signal stack via the I/O interface 201. The plurality of message signals is received from the one or more sensors configured in the vehicle. The plurality of message signals can be stored in the signal stack and are updated for every pre-defined time interval for storing the new message signals.

Figure 4:
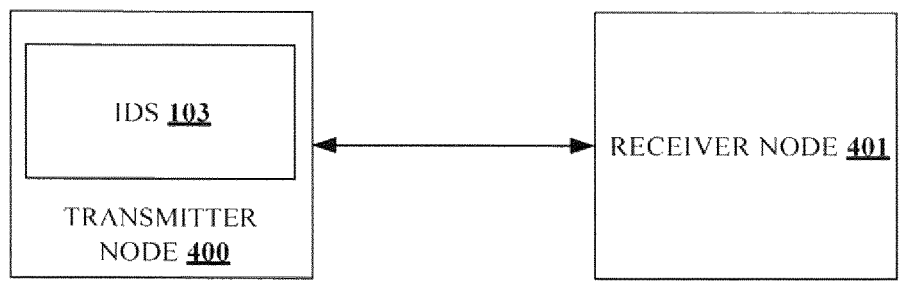
FIG. 4 is indicative of communication between transmitter node and a receiver node for detecting intrusion in a distributed field bus of an in-vehicle network in accordance with some embodiments of the present disclosure.

FIG. 4 is indicative of communication between a transmitter node 400 and a receiver node 401 for detecting intrusion in a distributed field bus of an in-vehicle network in accordance with some embodiments of the present disclosure. The IDS 103 is configured in the transmitter node 400. In an embodiment the transmitter node 400 may be the ECU or the gateway 102. The receiver node 401 may be one of the ECU or the gateway 102. In an embodiment, the transmitter node 400 packs the plurality of message signals in one or more a Protocol Data Units (PDUs) or in a frame comprising one or more PDUs. The one or more PDUs or the frame is configured for transmission to the receiver node 401 over the distributed field bus 104. In an embodiment, the PDUs or the frame is configured to be transmitted within a predefined time period. In an embodiment, the IDS 103 may be configured in the receiver node 401.

Referring back to FIG. 3, the at least one message signal is accessed and retrieved from the signal stack to which the stack index is pointing. The stack index is generated using the random private key and a gate function.

A random number generator associated with the transmitter node 400 may be used to generate the random private key. The random private key is received by the IDS though the I/O interface 201 when required.

The gate function is implemented in the IDS 103. The gate function performs two different functions based on the random private key. The first function performed by the gate function is computation of a gate sequence for determining the intervals in which the HPT signal is generated. The gate sequence is computed based on equation 1.

$$\tau(\text{Gate}) = n * \Delta t \quad (1)$$

where, $\tau$ (Gate) is the task time of the gate sequence, n is the number of honeypot signal changes allowed, $\Delta t$ is the message cycle time. The signal stack may be updated at the rate of $\Delta t$. The gate sequence is n times faster than the message cycle time. Thus, any change in value of the message signals stored in the signal stack can be retrieved and a corresponding hash signal is generated using the changed value of the message signal. The gate sequence is a binary bit stream where bit 1 represents that a signal change is allowed and bit 0 represents that a signal change is not allowed. For instances when the gate sequence has a bit 1, the at least one message signal is retrieved from the signal stack based on the stack index. Thereby, if the gate sequence has three is in the binary bit stream, then three message signals may be retrieved from the signal stack based on the stack index generated at the corresponding instances.

The second function performed by the gate function is generation of the stack index. The index generation module 210 uses the gate function for generating the stack index. The stack index is calculated based on the equation 2. The stack index is used for accessing the at least one message signal from the signal stack.

If { digsum$\{G(t)\}=x$ then

Index=$x$ else

Index=sum(digsum$\{G(t)\}$)  (2)

Where G(t) is the generated gate sequence for a pre-defined time interval of message cycle time, x is arbitrarily chosen during the ECU power-up, and Index is the stack index for the signal stack. For a PDU cycle (pre-defined time interval of message cycle time) where n=3 then G(t) is a Boolean 1 for three times longer than the $\Delta t$. For calculating the stack index of the signal stack, a digit sum of G(t) is arbitrarily initialized to x to make it harder to predict the index value. Therefore, Index may be equal to x, if not the index may be any number resulted from the sum of all the Boolean digit sum of G(t) for a corresponding message cycle. Thus, the random private key and the gate function enables a random message signal to be chosen from the signal stack. The intruder may find it difficult for determining the at least one message signal which is used for generating the first HPT signal.

Figure 5A:
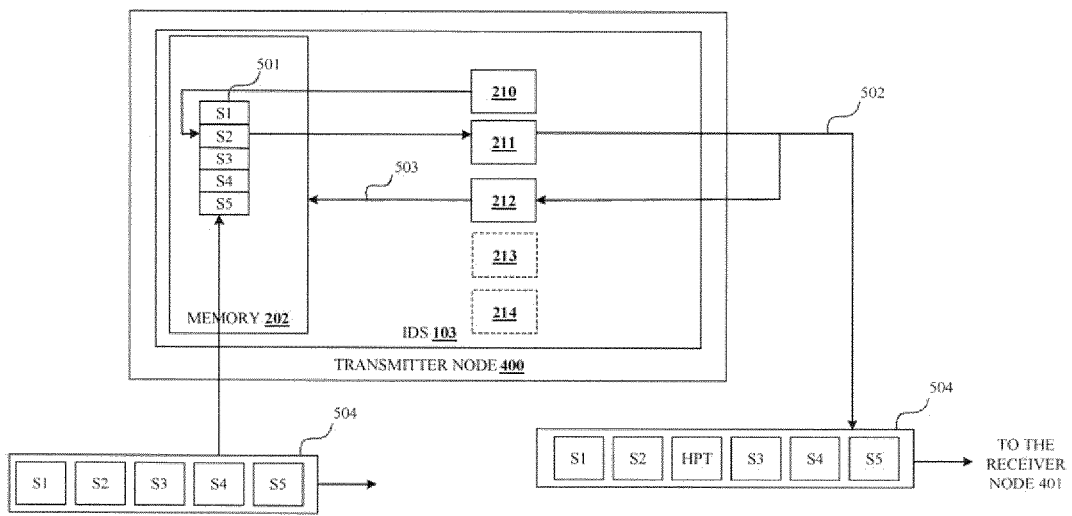
FIG. 5A is a block diagram of a node configured in a transmission mode in accordance with some embodiments of the present disclosure.

FIG. 5A is a block diagram of a node configured in a transmission mode in accordance with some embodiments of the present disclosure.

FIG. 5A illustrates the transmitter node 400 and the IDS 103 configured in the transmitter node 400. The IDS 103 comprises a signal stack 501 in the memory 202. The signal stack 501 comprises the plurality of message signals configured for transmission from the transmitter node 400. The plurality of message signals is packed in a PDU 504 by the transmitter node 400 at a given time instance. The message cycle time of the PDU is $\Delta t$. The IDS 103 retrieves the plurality of message signals from the PDU 504 and stores the plurality of message signals in the signal stack 501. Further, the index generation module 210, the hash signal generation module 211, the echo-has signal generation module 212, the time synchronization module 213 and the verification module 214 are depicted in the IDS 103. The index generation module 210 generates the stack index for accessing at least one message signal from the plurality of message signals present in the signal stack 501. The stack index points to a second message signal S2. When the bit stream of the gate sequence is 1, the second message signal is retrieved from the signal stack 501 and is provided to the hash signal generation module 211.

Referring back to FIG. 3, at step 302, the first HPT signal is generated by the hash signal generation module 211 of the transmitter node 400 by performing the hash function on the at least one message signal. As illustrated in FIG. 5A, the second message signal retrieved from the signal stack 501 is provided to the hash signal generation module 211 for generating an HPT signal 502. The hash function is performed on the second message signal for generating the HPT signal 502. The HPT signal 502 is packed within the PDU 504 (initially comprising the plurality of message signals) along with the plurality of message signals. The PDU 504 is transmitted to the receiver node 401 by the transmitter node 400. The PDU 504 comprising the first HPT signal and the plurality of message signals is configured to be transmitted by the transmitter node 400 in the time interval Δt. In an embodiment, the method step steps 301 and 302 are performed within the time interval Δt. As the PDU 504 comprises the first HPT signal (similar to a normal message signal) and the plurality of message signals, the intruder is tricked/deceived. The intruder believes that the HPT signal is a normal message signal and tries to access the HPT signal.

At step 303, the reference HPT signal is generated by the echo-hash signal generation module 212 of the transmitter node 400. As illustrated in FIG. 5A, the HPT signal is echoed using the echo-hash function and the echo-hash function is performed on the first HPT signal 502 by the transmitter node 400 to generate a Reference E-HPT signal 503. The Reference E-HPT signal 503 is stored in the memory 202. The echo-hash signal generation module 212 present in the transmitter node 400 is configured in the receiver node 401.

Figure 5B:
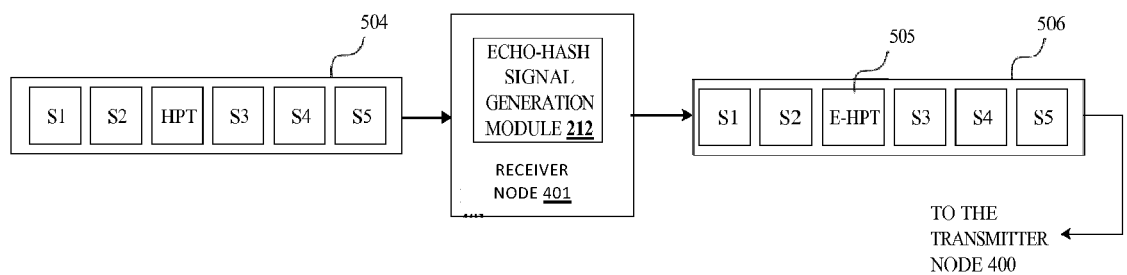
FIG. 5B shows processing of PDU by a receiver node in accordance with some embodiments of the present disclosure.

FIG. 5B is indicative of processing of frame by the receiver node 401 in accordance with some embodiments of the present disclosure.

FIG. 5B illustrates the PDU 504, the receiver node 401, and a PDU 506. Referring back to FIG. 3 at step 304, the second HPT signal is received from the receiver node 401. As illustrated in FIG. 5B, the PDU 504 comprising the HPT signal 502 is received at the receiver node 401. The receiver node 401 comprises the echo-hash signal generation module 212 which is similar to the echo-hash signal generation module 212 present in the transmitter node 400. The receiver node 401 echoes the HPT signal 502 using the echo-hash function and generates a first E-HPT signal 505 by performing the echo-hash function on the first HPT signal 502. Further the receiver node 401 packs the First E-HPT signal 505 in a PDU 506 along with the other message signals present in the PDU 504 and transmits the PDU 506 back to the transmitter node 400. The first HPT signal 502 is echoed and hashed using the echo-hash function so that similar signals do not exist in the bus traffic between the transmitter node 400 and the receiver node 401. The first HPT signal 502 and the first E-HPT signal 505 appear different and hence the intruder may be tricked to believe that the first E-HPT signal 505 (a hash signal of the first HPT signal 502) is a normal message signal.

At step 305, the reference HPT signal and the second HPT signal are compared. The value of the comparison is used to detect the intrusion in the distributed field bus 104. The first HPT signal is transmitted by the transmitter node 400 to the receiver node 401 and the first HPT signal takes some amount of time to reach the receiver node 401. Further, the receiver node 401 takes some amount of time to compute the second HPT signal and transmit the second HPT signal back to the transmitter node 400. Thus, the second HPT signal is time compensated by synchronizing time instance of the reference HPT signal generation and the reception of second HPT signal is synchronized by the time synchronization module 213. The synchronization is performed using time sync parameters. Therefore, a time delay is quantized to determine whether if the honeypot signals are altered for each message cycle. The time delay is computed by equation 3.

$$\tau(Sync) = t - (\alpha + \beta + \gamma) * \Delta t \qquad (3)$$

where, α is the time synchronization constant for the echo-hash function generation on the receiver node 401; β is the time synchronization constant for the PDU communication from the receiver node 401 to the transmitter node 400; γ is the time synchronization constant for honeypot verification logic to compare the HPT signals from the transmitter node 400 and the receiver node 401; and t is the time index.

Figure 5C:
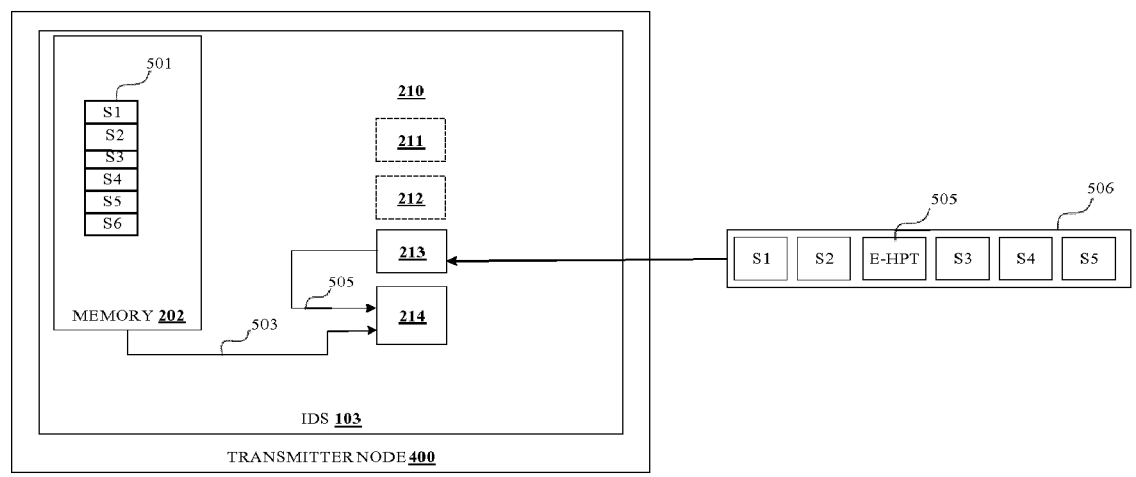
FIG. 5C is a block diagram of a node configured in a reception mode in accordance with some embodiments of the present disclosure.

Further, the verification module 214 computes difference between the reference HPT signal and the second HPT signal based on the time synchronization as mentioned in equation 4. Let the reference HPT signal be $H_S(t)$ and the second HPT signal received from the receiver node 401 be $H_{REF}(t)$.

$$H_{Diff}(t) = H_S(t) - H_{REF}(t - (\alpha, \beta, \gamma) * \Delta t) \qquad (4)$$

where, $H_S(t)$ is the reference HPT signal stored in the memory by the transmitter node 400 and $H_{REF}(t-(\alpha+\beta+\gamma)*\Delta t)$ is the time quantized second HPT signal (received from the receiver node 401). In principle if the time delay is compensated appropriately with time sync constants. The reference HPT stored in the transmitter node 400 is identical to the second HPT signal that is received by the receiver node 401. If the value of $H_{Diff}(t)$ is negligible then it implies that no intrusion is detected on the distributed field bus 104. As illustrated in FIG. 5C, the transmitter node 400 receives the PDU 506 comprising the First E-HPT signal 505 sent by the receiver node 401. The time synchronization module 213 of the IDS 103 configured in the transmitter node 400 receives the First E-HPT signal 505 and performs time compensation as mentioned in equation 3. Further, the time compensated First E-HPT signal 505 is sent to the verification module 214 for verification. The verification module 214 retrieves the Reference E-HPT signal 503 from the memory 202 and compares the Reference E-HPT signal 503 with the time compensated First E-HPT signal 505 as mentioned in the equation 4. The intrusion is detected based on one of counter diagnostics and integral diagnostics. Counter diagnostics comprises determining the number of bit changes in the second HPT signal in comparison with the reference HPT signal over a pre-defined period of time and the integral diagnostics comprises determining amount of change in the second HPT signal in comparison with the reference HPT signal. Therefore, both the relative and the integral deviation between the two honeypot signals is calculated using the counter and integral based diagnostics.

Figure 5D:
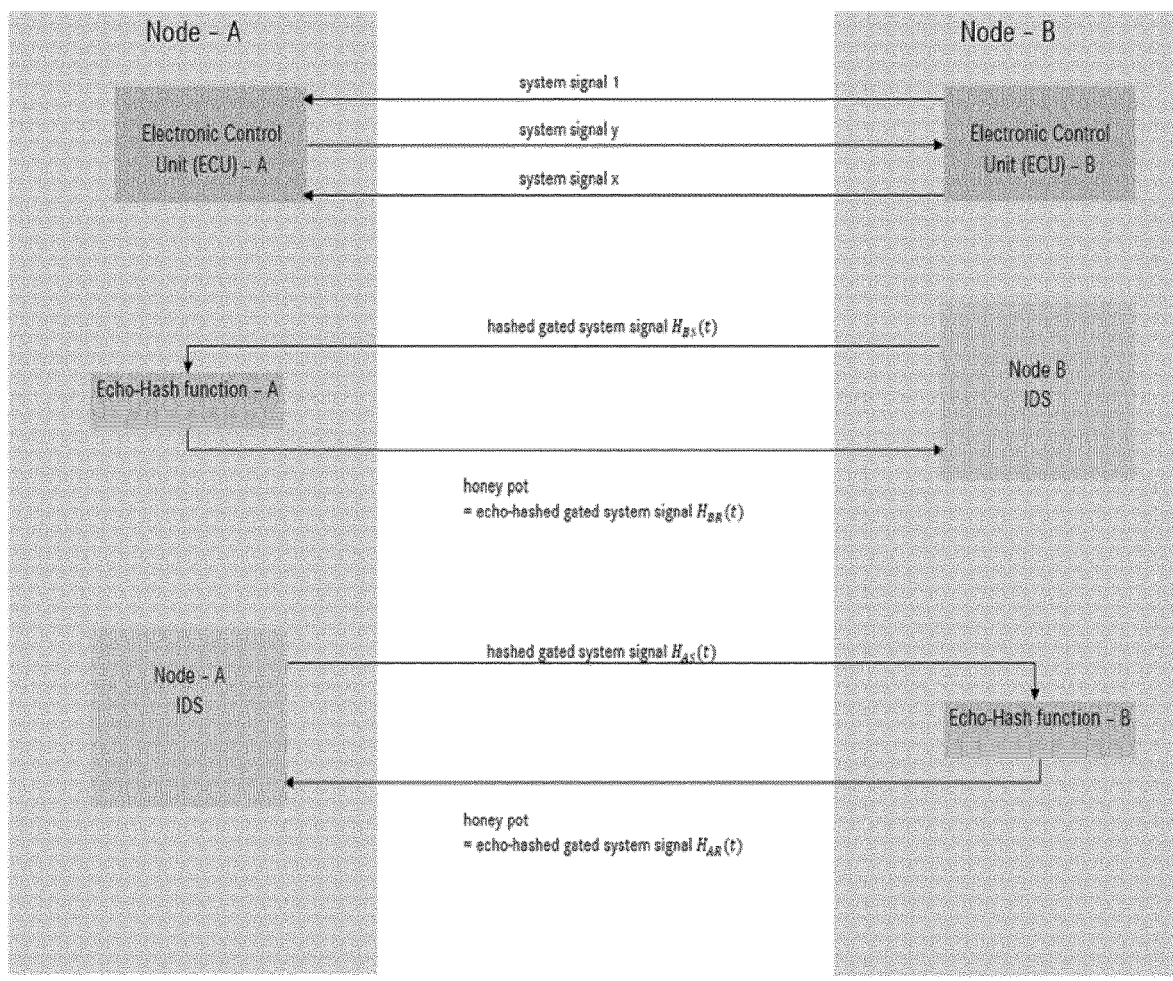
FIG. 5D shows a flow diagram representing creation of honeypot loops, in accordance with some embodiments of the present disclosure.

In an embodiment the IDS 103 may be configured in both the transmitter node 400 and the receiver node 401. Let the nodes be represented as node A and node B as illustrated in FIG. 5D. Node A comprises the ECU A and node B comprise ECU B. When node A is configured as the transmitter node 400, the IDS 103 deployed in node A creates an HPT loop as indicated by the H_AS (t) and H_AR (t) in FIG. 5D. Further, when node B is configured as the transmitter node 400, the IDS 103 deployed in node B creates an HPT loop as indicated by H_BS (t) and H_BR (t) creating two different independent honeypot loops between the ECU's ECU A and ECU B.

The method and system perform intrusion detection in real time and is computationally inexpensive as the method and system does not use symmetric/asymmetric keys and does not involve additional hardware unit for detecting intrusion.

The method and system are independent of network traffic timing, which is one of the major advantages when compared to any prior art. Any changes to the content and timing of the network doesn't have an influence on the honeypot mechanism because the method and system only analyze the honeypot signals from sender and receiver node irrespective of other network traffic.

The method and system can localize security dynamics providing in-depth security for in-vehicle architecture.

The method and system make the intruder believe the Honeypot signals to be a normal message signal, thus when the intruder tries to access the Honeypot signal the system is alerted of intrusion.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise. A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| REFERRAL NUMERALS: | |
| --- | --- |
| Reference number | Description |
| 100 | Environment |
| 101 | Plurality of nodes/ECUs |
| 102 | Gateway/MCU |
| 103 | Intrusion detection system |
| 104 | Distributed field bus |
| 201 | I/O interface |
| 202 | Memory |
| 203 | Processor |

-continued

| REFERRAL NUMERALS: | |
|---|---|
| Reference number | Description |
| 204 | Data |
| 205 | Message signal |
| 206 | Private key data |
| 207 | Echo-hash signals |
| 208 | Other data |
| 209 | Modules |
| 210 | Index generation module |
| 211 | Hash signal generation module |
| 212 | Echo-hash signal generation module |
| 213 | Time synchronization module |
| 214 | Verification module |
| 215 | Other modules |
| 400 | Transmitter node |
| 401 | Receiver node |
| 501 | Signal stack |
| 502 | First HPT signal |
| 503 | Reference E-HPT signal |
| 504, 506 | PDU |
| 505 | First E-HPT signal |

We claim:

1. A method for detecting intrusion in a field-bus network comprising a plurality of nodes, the method comprising:
receiving, by an intrusion detection system in a first node among the plurality of nodes, a plurality of message signals;
generating, by the intrusion detection system in the first node, a first honeypot signal by performing a hash function using at least one message signal among the plurality of message signals, wherein the first honeypot signal is generated to mimic the at least one message signal;
transmitting, by the intrusion detection system in the first node to a second node among the plurality of nodes, the first honeypot signal along with the plurality of message signals;
generating, by the intrusion detection system of the first node, a reference honeypot signal by computing an echo-hash function to the generated first honeypot signal, wherein the reference honeypot signal is stored in a memory associated with the intrusion detection system in the first node;
receiving, by the intrusion detection system in the first node from the second node, a second honeypot signal, wherein the second honeypot signal is generated by performing the echo-hash function on the transmitted first honeypot signal; and
comparing, by the intrusion detection system in the first node, the reference honeypot signal and the second honeypot signal in order to detect the intrusion in the field-bus network.

2. The method of claim 1, wherein the plurality of message signals is stored in the memory, and wherein the at least one message signal is accessed by a stack index generated based on a random private key and a gate function.

3. The method of claim 2, wherein the gate function computes a gate sequence for determining intervals in which the first honeypot signal is generated based on the random private key, wherein the gate sequence determines when signal changes are allowed, wherein the gate sequence is a binary bit stream where bit 1 represents that a first honeypot signal change is allowed and bit 0 represents that a first honeypot signal change is not allowed.

4. The method of claim 3, wherein the stack index is generated based on the gate sequence and the random private key by at least one of:
initializing a digit sum of the gate sequence to an arbitrary value; and
determining a number resulted from sum of all the Boolean digit sum of the gate sequence determined for a message cycle.

5. The method of claim 1, wherein the first honeypot signal and the plurality of message signals are packed in a protocol data unit and the protocol data unit is configured for transmission within a message cycle time.

6. The method of claim 1, wherein
a time delay between an amount of time consumed by the second node to compute the second honeypot signal and transmit the second honeypot signal to the intrusion detection system in the first node is compensated for detecting intrusion on the distributed field bus,
for each message cycle, the second honeypot signal is time compensated by synchronizing a time instance of the second honeypot signal in comparison with a time instance of the reference honeypot signal, and the time synchronization is performed using time sync parameters comprising time synchronization constants for the echo-hash function on the second node to generate the second honeypot signal, a time synchronization constant for cyclic communication from the second node to the first node, a time synchronization constant for a verification logic to compare the second honeypot signal from the second node with the reference honeypot signal from the first node, and time instance of transmission of the first honeypot signal.

7. The method of claim 1, wherein the comparison is performed based on one of counter diagnostics and integral diagnostics for detecting intrusion on the field-bus network.

8. The method of claim 7, wherein
the counter diagnostics comprises determining a number of bit changes in the second honeypot signal in comparison with the reference honeypot signal over a pre-defined period of time, and
the integral diagnostics comprises determining amount of change in the second honeypot signal in comparison with the reference honeypot signal.

9. The method of claim 1, wherein the intrusion detection system is configured in both the first node and the second node for generating independent honeypot loops with respect to the first node and the second node, wherein
a first honeypot loop comprises the reference honeypot signal generated by the first node and the second honeypot signal generated by the second node, wherein in the first honeypot loop the first node is configured as a sender node and the second node is configured as a receiver node; and
a second honeypot loop comprises a reference honeypot signal generated by the second node and a second honeypot signal generated by the first node, wherein in the second honeypot loop the second node is configured as a sender node and the first node is configured as a receiver node.

10. An intrusion detection system, for detecting intrusion in a field-bus network comprising a plurality of nodes, the intrusion detection system provided in a first node configured to transmit a plurality of message signals, the intrusion detection system comprising:

a processor; and a memory, communicatively coupled to the processor, storing processor executable instructions, which, when executed by the processor causes the processor to:
  receive, the plurality of message signals;
  generate a first honeypot signal by performing a hash function using at least one message signal among the plurality of message signals, wherein the first honeypot signal is generated to mimic the at least one message signal;
  generate, a reference honeypot signal by echoing the first honeypot signal using an echo-hash function, wherein the reference honeypot signal is stored in the memory;
  transmit, to a second node of the plurality of nodes, the first honeypot signal along with the plurality of message signals;
  receive a second honeypot signal from the second node, wherein the second honeypot signal is generated by performing the echo-hash function on the first honeypot signal; and
  compare, the reference honeypot signal and the second honeypot signal, for detecting an intrusion in the network.

11. The intrusion detection system of claim 10, wherein
  the memory comprises the plurality of message signals, and
  the at least one message signal among the plurality of message signals is accessed by a stack index generated based on a random private key and a gate function.

12. The intrusion detection system of claim 10, wherein the first honeypot signal and the plurality of message signals are packed in a protocol data unit and the protocol data unit is configured for transmission within a message cycle time.

13. The intrusion detection system of claim 10, wherein the processor is configured to compare the first honeypot signal and the reference honeypot signal based on one of counter diagnostics and integral diagnostics for detecting intrusion on the field-bus network.

14. The intrusion detection system of claim 13, wherein
  the counter diagnostics comprises determining a number of bit changes in the second honeypot signal in comparison with the reference honeypot signal over a pre-defined period of time, and
  the integral diagnostics comprises determining amount of change in the second honeypot signal in comparison with the reference honeypot signal.

* * * * *